United States Patent
Park et al.

(10) Patent No.: US 8,283,918 B2
(45) Date of Patent: Oct. 9, 2012

(54) APPARATUS AND METHOD FOR SEARCHING EDDY CURRENT OF ELECTRIC HEAT TUBE USING MEASURING MAGNETIC PERMEABILITY IN STEAM GENERATOR

(75) Inventors: Duck-Gun Park, Daejeon (KR); Derac Son, Daejeon (KR); Kwon-Sang Ryu, Daejeon (KR); Dae-hyuk Jyung, Seoul (KR); Whung-whoe Kim, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 650 days.

(21) Appl. No.: 12/161,754

(22) PCT Filed: Jan. 23, 2007

(86) PCT No.: PCT/KR2007/000353
§ 371 (c)(1),
(2), (4) Date: Jul. 22, 2008

(87) PCT Pub. No.: WO2007/086666
PCT Pub. Date: Aug. 2, 2007

(65) Prior Publication Data
US 2010/0301851 A1   Dec. 2, 2010

(30) Foreign Application Priority Data
Jan. 25, 2006   (KR) .................. 10-2006-0007681

(51) Int. Cl.
*G01N 27/82*   (2006.01)
(52) U.S. Cl. ........ 324/240; 324/220; 324/221; 324/237; 324/238; 702/38; 702/35; 336/221; 336/222; 336/225

(58) Field of Classification Search .................. 324/220, 324/221, 237, 238, 240, 228, 234, 239; 702/38, 702/35; 336/221, 222, 225
See application file for complete search history.

(56) References Cited

U.S. PATENT DOCUMENTS
2,963,645 A * 12/1960 Walkup et al. ................ 335/284
(Continued)

FOREIGN PATENT DOCUMENTS
JP   2007121193 A * 5/2007
(Continued)

OTHER PUBLICATIONS

L.S. Obrutsky, V.S.Cecco, and S.P. Sullivan, "Transmit-Receive Eddy Current Probes for Defect Detection and Sizing in Steam Generator Tubes", Feb. 1997, Proceedings of the CNRA/CSNI Workshop on Steam Generator Tube Integrity in Nuclear Power Plants, Oct. 30-Nov. 2, 1995, pp. 305-312.*

(Continued)

*Primary Examiner* — Patrick Assouad
*Assistant Examiner* — Lamarr Brown
(74) *Attorney, Agent, or Firm* — Pearne & Gordon LLP

(57) ABSTRACT

A detection apparatus for an eddy current in a heat generating tube using a permeability measurement method, and a method using the apparatus are provided. In the detection apparatus, a bobbin type probe acquires detection information with respect to a magnetic flux change by a magnetic phase occurring in the heat generating tube using a coil which is wound in an axis direction of at least one yoke located in a perpendicular direction with a bobbin of the bobbin type probe, and a material having a corresponding magnetic phase and a circumferential defect, which is difficult to be detected by the bobbin type probe, are detected based on the detection information.

21 Claims, 6 Drawing Sheets

U.S. PATENT DOCUMENTS

| | | | | |
|---|---|---|---|---|
| 3,693,075 | A * | 9/1972 | Forster | 324/229 |
| 3,786,684 | A * | 1/1974 | Wiers et al. | 73/866.5 |
| 4,105,972 | A * | 8/1978 | Smith | 324/220 |
| 4,215,310 | A * | 7/1980 | Schwerer, III | 324/225 |
| 4,368,694 | A * | 1/1983 | Ward et al. | 122/504 |
| 4,602,212 | A * | 7/1986 | Hiroshima et al. | 324/227 |
| 4,675,604 | A * | 6/1987 | Moyer et al. | 324/220 |
| 4,772,849 | A * | 9/1988 | Tedder | 324/220 |
| 4,789,827 | A * | 12/1988 | Bergander | 324/220 |
| 4,797,613 | A * | 1/1989 | Wentzell | 324/220 |
| 4,806,863 | A * | 2/1989 | White | 324/238 |
| 4,855,676 | A * | 8/1989 | Cecco et al. | 324/220 |
| 4,857,851 | A * | 8/1989 | Anderson et al. | 324/326 |
| 5,049,817 | A * | 9/1991 | Cecco et al. | 324/220 |
| 5,117,182 | A * | 5/1992 | Cecco et al. | 324/220 |
| 5,122,743 | A * | 6/1992 | Blakeley et al. | 324/225 |
| 5,174,165 | A * | 12/1992 | Pirl | 73/866.5 |
| 5,237,270 | A * | 8/1993 | Cecco et al. | 324/220 |
| 5,313,838 | A * | 5/1994 | Gondard et al. | 73/623 |
| 5,333,502 | A * | 8/1994 | Clark et al. | 73/623 |
| 5,446,382 | A * | 8/1995 | Flora | 324/232 |
| 5,565,773 | A * | 10/1996 | Inaguma et al. | 324/239 |
| 5,623,203 | A * | 4/1997 | Hosohara et al. | 324/220 |
| 5,821,747 | A * | 10/1998 | Atherton et al. | 324/220 |
| 5,914,595 | A * | 6/1999 | Piriou et al. | 324/220 |
| 6,087,830 | A * | 7/2000 | Brandly et al. | 324/220 |
| 6,291,992 | B1 * | 9/2001 | van Andel et al. | 324/240 |
| 6,316,937 | B1 * | 11/2001 | Edens | 324/220 |
| 6,359,434 | B1 * | 3/2002 | Winslow et al. | 324/220 |
| 6,479,992 | B2 * | 11/2002 | Kato et al. | 324/232 |
| 6,600,982 | B1 | 7/2003 | Cragun | |
| 6,657,440 | B1 * | 12/2003 | Amini | 324/639 |
| 6,674,281 | B2 * | 1/2004 | Shieh | 324/244.1 |
| 6,794,884 | B2 * | 9/2004 | Kliman et al. | 324/545 |
| 6,847,207 | B1 * | 1/2005 | Veach et al. | 324/220 |
| 7,038,445 | B2 * | 5/2006 | Walters et al. | 324/240 |
| 7,154,264 | B2 * | 12/2006 | Burkhardt et al. | 324/220 |
| 7,256,576 | B2 * | 8/2007 | Mandziuk et al. | 324/220 |
| 2001/0008404 | A1 | 7/2001 | Naito et al. | |
| 2001/0017541 | A1 * | 8/2001 | Kwun et al. | 324/240 |
| 2002/0153883 | A1 * | 10/2002 | Hur et al. | 324/220 |
| 2002/0188390 | A1 | 12/2002 | Ichihara et al. | |
| 2003/0025497 | A1 * | 2/2003 | Collingwood et al. | 324/242 |
| 2003/0107367 | A1 * | 6/2003 | Biester et al. | 324/207.2 |
| 2003/0114968 | A1 | 6/2003 | Sato et al. | |
| 2003/0117134 | A1 * | 6/2003 | Almaguer | 324/221 |
| 2004/0186663 | A1 | 9/2004 | Irie | |
| 2004/0207394 | A1 * | 10/2004 | Harthorn et al. | 324/216 |
| 2004/0217759 | A1 * | 11/2004 | Burkhardt et al. | 324/220 |
| 2004/0227509 | A1 * | 11/2004 | Ucan | 324/220 |
| 2004/0257072 | A1 * | 12/2004 | Samson | 324/242 |
| 2006/0008367 | A1 * | 1/2006 | Yokozawa et al. | 417/418 |
| 2007/0222438 | A1 * | 9/2007 | Reeves | 324/240 |
| 2007/0229066 | A1 * | 10/2007 | Narishige et al. | 324/222 |
| 2008/0042646 | A1 * | 2/2008 | Burkhardt et al. | 324/240 |
| 2009/0138222 | A1 * | 5/2009 | Kinomura et al. | 702/69 |
| 2010/0301851 | A1 * | 12/2010 | Park et al. | 324/240 |

FOREIGN PATENT DOCUMENTS

| | | |
|---|---|---|
| KR | 2019900013272 U | 7/1990 |
| KR | 1020000044060 A | 7/2000 |
| KR | 1020060004713 A | 1/2006 |
| KR | 1020050078668 A | 8/2006 |

OTHER PUBLICATIONS

"Detecting "Invisible" Flaws—To Improve the Safety Management Techniques of Steam Generator Tubes", Persistent Quest-Research Activities 2000, Copyright (c) Japan Atomic Energy Research Institute, pp. 1-3.*

Presistent Quest 2000 date.*

International Search Report dated Apr. 26, 2007.

Written Opinion for PCT/KR2007/000353 dated Apr. 26, 2007.

Extended European Search Report for 07708609 dated May 10, 2012.

* cited by examiner

APPARATUS AND METHOD FOR SEARCHING EDDY CURRENT OF ELECTRIC HEAT TUBE USING MEASURING MAGNETIC PERMEABILITY IN STEAM GENERATOR

TECHNICAL FIELD

The present invention relates to a defect detection apparatus in a heat generating tube. More particularly, the present invention relates to a detection apparatus and a method using the apparatus in a heat generating tube in which an axial defect can be detected by a bobbin type probe, and also a circumferential defect and a feature of a material according to a magnetic phase which causes an error of analyzing a signal with respect to the axial defect can be detected by a yoke type probe.

BACKGROUND ART

Various types of erosions such as stress corrosion cracking, fitting, intergranular corrosion, and abrasion, and also mechanical damages occur in a heat generating tube of a nuclear power station. The erosions and mechanical damages are generally divided into an axial defect and a circumferential defect. The defects occurring in the heat generating tube hinder operational safety and an economical efficiency, for example, when the defects penetrate beyond a certain thickness of the heat generating tube, a primary cooling water contaminated by radioactivity leaks into a secondary cooling water, subsequently a nuclear power plant may become contaminated. Thus, a technique which can detect the defects and can measure a degree of the defects in advance is required.

In the nuclear power station, a newly occurring defect and development of an existing defect are inspected using a non-destructive method during routine maintenance, which is performed at every period. An eddy current test using a bobbin type probe is currently used to nondestructively inspect and measure the defects occurring in the heat generating tube.

Conventionally, in the eddy current test for the heat generating tube, a side wall of the heat generating tube is initially inspected using the bobbin type probe, and a part where an abnormal condition is detected is inspected in detail using a motorized rotating pan cake (MRPC) probe. The bobbin type probe has detection speed of 1 m per second capable of performing the detection at a comparatively higher speed, however the MRPC probe has low speed of 5 mm per second. Accordingly, a considerable amount of time is required to precisely detect the part where the abnormal symptom is detected.

Also, the eddy current test using the bobbin probe has a problem in that because a circumferential defect may not be detected, there is a high probability of an error in analyzing a signal with respect to the defects since a defect signal is distorted by a magnetic phase when the magnetic phase occurs in the heat generating tube.

Thus, an apparatus which can rapidly, precisely, and easily measure the defects occurring in the heat generating tube, and a method using the apparatus are earnestly required.

DISCLOSURE OF INVENTION

Technical Goals

The present invention provides a defect detection apparatus in a heat generating tube and a method using the apparatus which can rapidly, precisely, and easily detect an axial defect occurring in the heat generating tube, and also detect a circumferential defect and a material by a magnetic phase which causes an error in analyzing a signal with respect to the axial defect since a feature of the material by the magnetic phase is analyzed and a cause of the error in analyzing the signal are eliminated.

Technical Solutions

According to an aspect of the present invention, there is provided a defect detection apparatus including: a bobbin type probe forming a magnetizing force using a coil which is wound on at least one bobbin located in a circumferential direction to acquire first detection information to determine a defect of the heat generating tube; and a yoke type probe forming a magnetizing force using a coil which is wound in an axial direction of at least one yoke located in a perpendicular direction with the at least one bobbin to acquire second detection information from the heat generating tube, wherein the detecting apparatus determines a material by a magnetic phase, based on the second detection information.

According to another aspect of the present invention, there is provided a defect detection method including: forming a first magnetizing force using a coil which is wound on at least one bobbin located in a circumferential direction; sensing a change of the first magnetizing force, and acquiring first detection information to determine a defect of the heat generating tube; forming a second magnetizing force using a coil which is wound in an axial direction of at least one yoke located in a perpendicular direction with the at least one bobbin; sensing a change of the second magnetizing force acquiring second detection information from the heat generating tube; and determining a material by a magnetic phase, based on the second detection information.

BEST MODE FOR CARRYING OUT THE INVENTION

Figure 1:
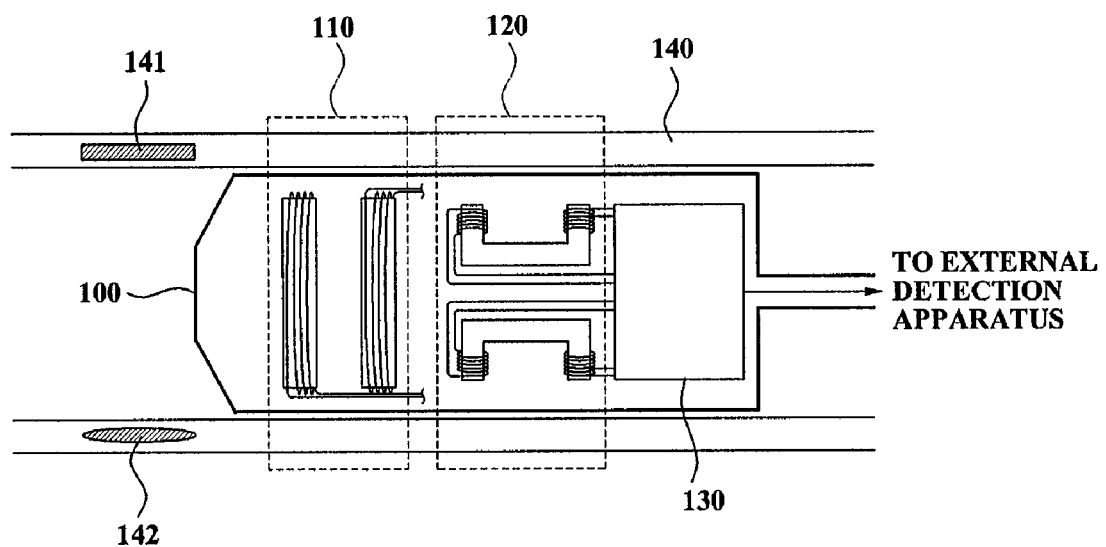
FIG. 1 is a diagram illustrating a defect detection apparatus according to an embodiment of the present invention.

FIG. 1 illustrates a detection apparatus 100 according to an embodiment of the present invention.

Referring to FIG. 1, the detection apparatus 100 in a heat generating tube 140 according the present invention includes a bobbin type probe 110, a yoke type probe 120, and a signal processor 130.

The detection apparatus 100 moves to an axis direction of the heat generating tube 140 after being inserted into the heat generating tube 140. Subsequently, the detection apparatus 100 acquires first detection information occurring in the heat generating tube 140 via the bobbin type probe 110. For this, the bobbin type probe 110 forms a magnetizing force using a coil which is wound on at least one bobbin located in a circumferential direction of the heat generating tube 140, and acquires the first detection information about a defect, more particularly an axial defect 141, from the heat generating tube 140. The first detection information about the acquired axial defect 141 is transmitted to an external detection apparatus, and subsequently an operator may monitor the axial defect 141 in the heat generating tube 140 via the first detection information to be outputted.

In a conventional defect detection apparatus, only the bobbin type probe 110 is used in the heat generating tube 140, and the information about the axial defect 141 is acquired. However, when there is a magnetic phase occurring during operation of the heat generating tube 140, the first detection information about the axial defect 141 may not be precisely acquired since the first detection information about the axial defect 141 is influenced by the magnetic phase. Also, a circumferential defect 142 by stress corrosion cracking may not be acquired via the bobbin type probe 110. The defects occurring in the heat generating tube 140 will be described in FIG. 2.

Figure 2:
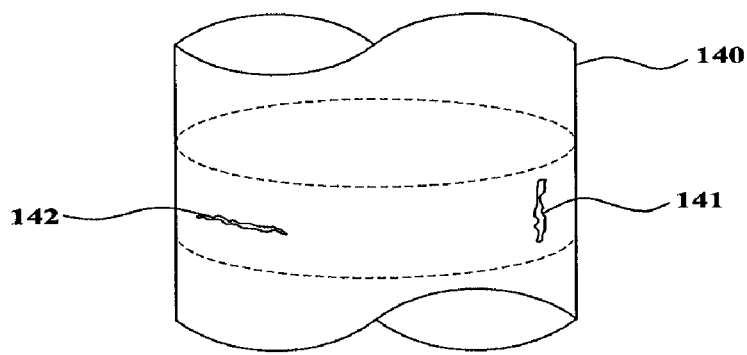
FIG. 2 is a diagram illustrating an axial defect and a circumferential defect occurring the a heat generating tube.

FIG. 2 illustrates an axial defect 141 and a circumferential defect 142 occurring a heat generating tube 140.

Referring to FIG. 2, defects may occur in a heat generating tube 140 due to various defects such as stress corrosion cracking, fitting, intergranular corrosion, abrasion, which influence a magnetic phase, and the defects may be divided into an axial defect 141 and the circumferential defect 142. In this instance, the defects are represented as the axial defect 141 and the circumferential defect 142, however other types of defects such as a diagonal defect and other irregular types of defects may be included within a range of the axial defect 141 and the circumferential defect 142, or may be included in a mixed range of the axial defect 141 with the circumferential defect 142.

In FIG. 1, the detection apparatus 100 acquires the circumferential defect 142 from the magnetic phase, which are unable to be acquired in the conventional art, using the yoke type probe 120. The yoke type probe 120 is used to detect the circumferential defect 142 by the magnetic phase, i.e. second detection information, using a coil which is wound in an axis direction of at least one yoke located in a perpendicular direction with the at least one bobbin. A defect in a perpendicular direction with the eddy current is easily detected when detecting the axial defect using an eddy current, however a circumferential defect in a parallel direction with the eddy current and the magnetic phase are not easily detected. To solve this problem, yokes of the yoke type probe 120 are perpendicularly located to the at least one bobbin.

Specifically, the detection apparatus 100 modulates a size of an external alternating current (AC) source, which is supplied via a signal processor 130 from an outside, and transmits the modulated external alternating current to a first coil of the yoke type probe 120. The signal processor 130 senses a magnetic flux density change (this is referred to as 'magnetic flux') with respect to a strength of a magnetizing force, formed in a second coil, using a magnetic sensor, and amplifies an electrical signal from the magnetic sensor according to the magnetic flux change. Also, the signal processor 130 converts the amplified electrical signal to a digital signal, and transmits the digital signal to the external detection apparatus. Consequently, the detection apparatus 100 may monitor the axial defect 141 occurring in the heat generating tube 140, and also information such as a voltage level change due to the circumferential defect 142 and the magnetic phase.

The signal processor 130 according to the embodiment of the present invention may use a serial communication medium of a recommended standard (RS)-422 to prevent signal distortion when measuring the magnetic phase, and to transmit an acquired electric signal by reducing a noise to the external detection apparatus. Including the serial communication medium of the RS-422, various communication media may be used for the transmission of the electric signal.

The detection apparatus 100 using the eddy current is supplied with a sinusoidal voltage from a control box via a cable of dozens of meters. In this instance, in terms of a signal-to-noise ratio, it is difficult to transmit data to the external detection apparatus via the cable of dozens of meters by the yoke type probe 120 since there are many cables, and a size of a signal is less. Accordingly, the signal sensed by the signal processor 130 of the detection apparatus 100 is required to be amplified and digitalized before transmitting the signal to the external detection apparatus. For this, the signal processor 130 may transmit the data to the external detection apparatus via the RS-422 in a different signal transmission method capable of long range communication, the data having sensed in-phase and out-of phase components in the magnetic sensor, and having reflected the AD converted signals.

Figure 3:
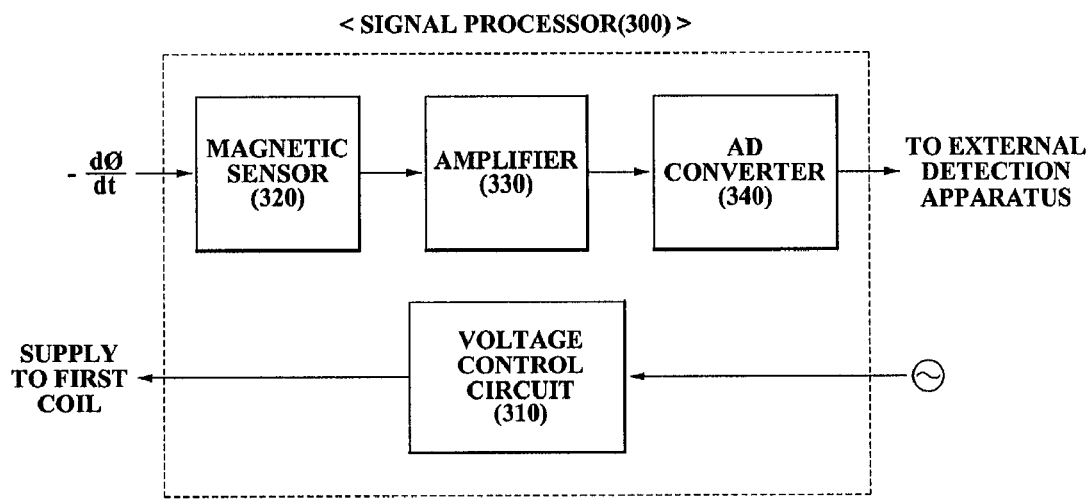
FIG. 3 is a diagram illustrating a signal processor of FIG. 1.

FIG. 3 illustrates the signal processor 300 of FIG. 1.

As illustrated in FIG. 3, the signal processor 300 of the detection apparatus 100 includes a voltage control circuit 310, a magnetic sensor 320, an amplifier 330, and an AD converter 340.

The voltage control circuit 310 converts an alternating current source of a sine wave or a cosine wave, which are supplied from the outside of the detection apparatus 100, to a direct current voltage to provide to a necessary circuit, and processes the alternating current source to transmit to a first coil of the yoke type probe 120 of the detection apparatus 100 of FIG. 1. Specifically, a magnetizing force H may be determined according to a signal from a resistance (R) (this will be referred to in FIGS. 4 and 6) in the voltage control circuit 310 to measure a flowing current in the first coil, permeability of a sample is determined along with measurement of an inductive electromotive force from a second coil, and consequently a material of a magnetic phase is determined.

According to a predetermined power which is supplied to the first coil via the voltage control circuit 310, the magnetic sensor 320 senses a magnetic flux change associated with the magnetizing force, formed in the second coil of the yoke type probe 120 of FIG. 1. Generally, a magnetic sensor senses the magnetic flux change, i.e. a voltage level change according to the inductive electromotive force, and converts the sensed voltage level change to an analog type electrical signal. As in the general magnetic sensor, the magnetic sensor 320 according to present invention senses the magnetic flux with respect to strength of a magnetic field formed in the second coil, and converts the sensed magnetic flux to an analog type electrical signal. In the specification of the present invention, the magnetic sensor 320 amplifies an electrical signal of the magnetic sensor 320 to a predetermined size when a phase of the AC source is 0 degree and 90 degrees, i.e. with respect to each of quadrature component. Specifically, the amplifier 330 may exclusively amplify an amplitude of the electrical signal by twice a constant number while maintaining a frequency feature of the electrical signal. Subsequently, the AD converter 340 performs sampling with respect to the signal, which is amplified, added, and reflected in the quadrature component, and quantizes into samples signal for conversion to a digitalized electrical signal. Also, the AD converter 340 may perform sampling with respect to each of the amplified quadrature component, digitalize the sampled quadrature component, and add the digitalized data.

In this instance, when the output of the AD converter 340 is less than a predetermined reference signal, this indicates there is a phase change in the quadrature component of the inductive electromotive force by the magnetic phase, consequently the detection apparatus 100 of FIG. 1 may sense an occurrence of the magnetic phase in the heat generating tube 140 of FIG. 1. Also, when output of the AD converter 340 is greater than the predetermined reference signal, this indicates there is no phase change in the quadrature component of the inductive electromotive force by the magnetic phase, consequently the detection apparatus 100 of FIG. 1 may sense there is no occurrence of the magnetic phase in the heat generating tube 140 of FIG. 1, and there is only a defect in the heat generating tube 140 of FIG. 1.

As describe above, an operator may check information about a material by the magnetic phase occurring in the heat generating tube 140 and the circumferential defect 142 of, and may take a proper action.

Figure 4:
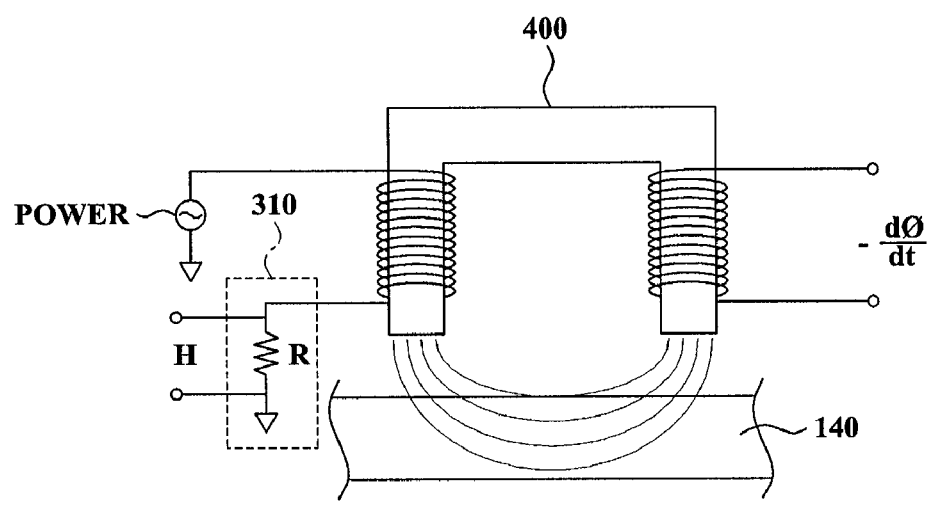
FIG. 4 is a diagram illustrating operation of a yoke type probe of FIG. 1 when there is no magnetic phase.
Figure 5:
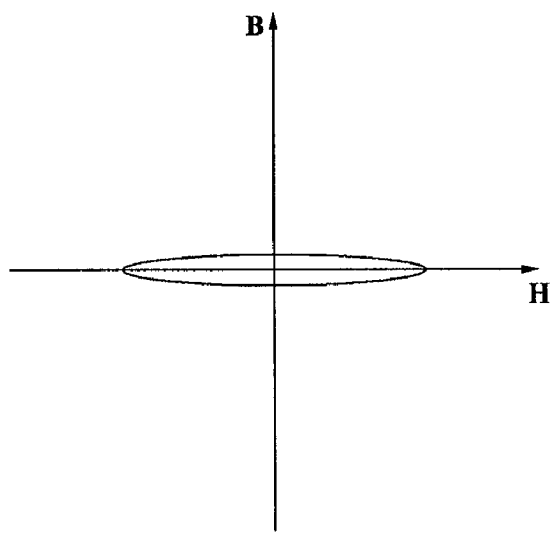
FIG. 5 is a graph illustrating a result that the detection apparatus detects a result (defect) of FIG. 4.
Figure 6:
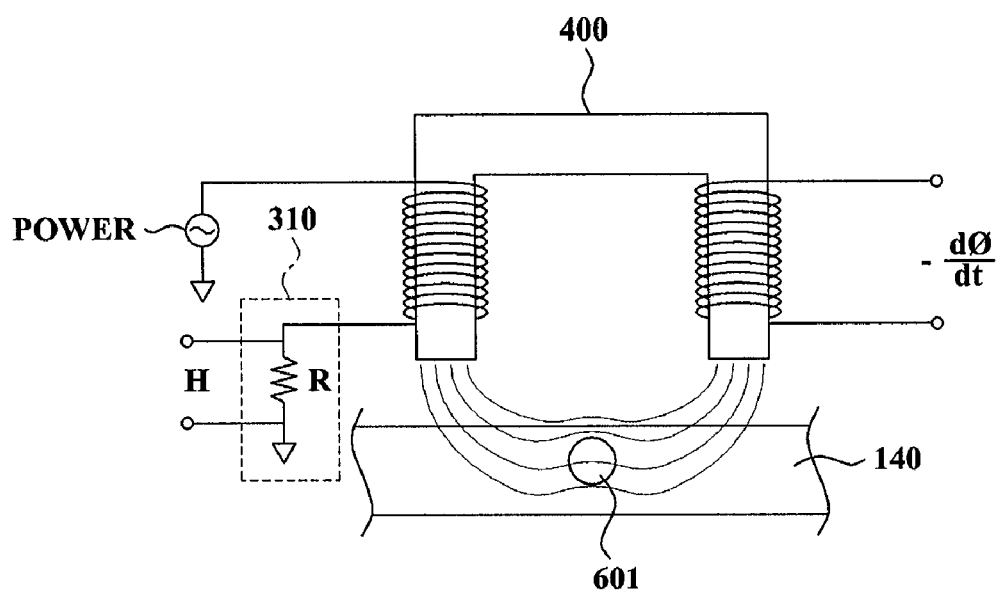
FIG. 6 is a diagram illustrating operation of the yoke type probe of FIG. 1 when there is a magnetic phase.
Figure 7:
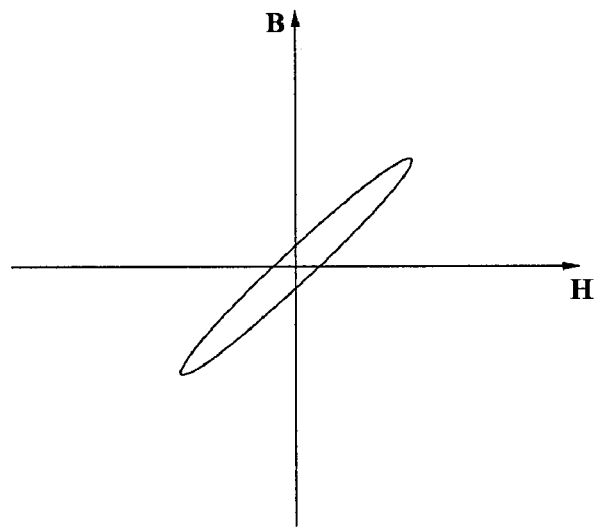
FIG. 7 is a graph illustrating a result of detection of FIG. 6.

FIGS. 4 and 6 illustrate the yoke type probe 120 of FIG. 1, and FIGS. 5 and 7 illustrate a result that the yoke type probe 120 detects a defect in a heat generating tube.

Referring to FIG. 4, a first coil wound on a magnetizing yoke 400 in the yoke type probe 120 is supplied with a predetermined power via a voltage control circuit 310, consequently a magnetizing force H occurs in a second coil. In this instance, the magnetizing force H may be determined using a voltage which is supplied to a resistance (R) in the voltage control circuit 310. In FIG. 4, the voltage control circuit 310 exclusively includes the R, however the voltage control circuit 310 may further include a manual device or other active devices such as an inductor (L) and a capacitor (C).

The magnetizing yoke 400 according to the an embodiment of the present invention is located on an imaginary line which connects a central axis with an external contact point of the heat generating tube of the heat generating tube 140 as illustrated in FIG. 1. In this instance, at least two magnetizing yokes 400 may be equipped in the detection apparatus 100 of FIG. 1, and as a result of this, the detection apparatus 100 may acquire second detection information over an entire range by the magnetic phase in the heat generating tube 140. Also, the AC current source is respectively flowed into a first coil of each of the magnetizing yokes 400, and a magnetic flux change may be respectively measured by a magnetizing force induced to each of the second coil corresponding to the first coil.

For this, the magnetizing yokes 400 according to the present invention may be made of a material having a high permeability. Namely, the magnetizing yokes 400 may be made of any one of a ferrite and an electric steel sheet (SiFe).

The magnetic sensor 320 of the signal processor 300 of FIG. 3 senses the magnetic flux change $-d\varnothing/dt$ induced in the second coil using the magnetizing force H. In this instance, when there is no occurrence of the magnetic phase in the heat generating tube 140 of FIG. 4, the magnetic flux is not changed by the magnetizing force H, subsequently a feature shown in a graph of FIG. 5 occurs. Consequently, when the external detection apparatus outputs a result corresponding to the graph of FIG. 5, the operator may determine there is no magnetic phase in the heat generating tube 140.

Referring to FIG. 6, the first coil wound on the magnetizing yoke 400 according to the present invention is supplied with a predetermined power via the voltage control circuit 310, and the magnetizing force H is formed in the second coil.

The magnetic sensor 320 of the signal processor 300 senses the magnetic flux change $-d\varnothing/dt$ induced in the second coil while having the magnetizing force H. In this instance, when there is a magnetic phase 601 in the heat generating tube 140, a magnetic flux is changed. Specifically, when there is the magnetic phase 601 at one side of a sample where lines of magnetic flux flow, the magnetic flex change $-d\varnothing/dt$ occurs, and a magnetic hysteresis curve occurs as illustrated in a graph of FIG. 7. Referring to FIG. 7, since a relation the magnetizing force H and a magnetic flux density B differs according to the magnetic flux change $-d\varnothing/dt$ by the magnetic phase 601 occurring tin the heat generating tube 140, the magnetic phase 601 having a corresponding permeability exists. Consequently, when the external detection apparatus outputs a result corresponding to a graph of FIG. 7, the manager may determine there is a circumferential defect 601 having a corresponding permeability in the heat generating tube 140, and proper maintenance may be performed. Generally, a material by the magnetic phase is understood via a tilt of the magnetic flux density B with respect to the magnetizing force H. In this instance, based on types or a size of the material of the magnetic phase 601, whether the corresponding material functions as a defect is determined, and the circumferential defect, which is difficult to be acquired by the bobbin type probe 110 of FIG. 1, is detected.

Specifically, as described above, the magnetic sensor 320 of FIG. 3 senses the magnetic flux change $-d\varnothing/dt$ with respect to the each of the quadrature component, the amplifier 330 amplifies a corresponding component, consequently the digital data, having been reflected in the quadrature component, from the AD converter 340 of FIG. 3. The detection apparatus of the manager may understand the circumferential defect 601 according to the material by the magnetic phase, or the magnetic phase by detecting the output of the AD converter 340.

As an example, when the material by the magnetic phase is determined as simple deformation of the heat generating tube 140 which is made of a non-magnetic substance, regardless of the defect, it is analogized that a corresponding location is not a critical defect even when it is determined as a defect by the first detection information from the bobbin type probe 110 of FIG. 1. When the material by the magnetic phase is determined as erosions such as stress corrosion cracking, fitting, intergranular corrosion, and abrasion, and mechanical damages, the corresponding location where the magnetic phase functions may be determined as a critical defect along with the first detection information from the bobbin detection probe 110 of FIG. 1.

Figure 8:
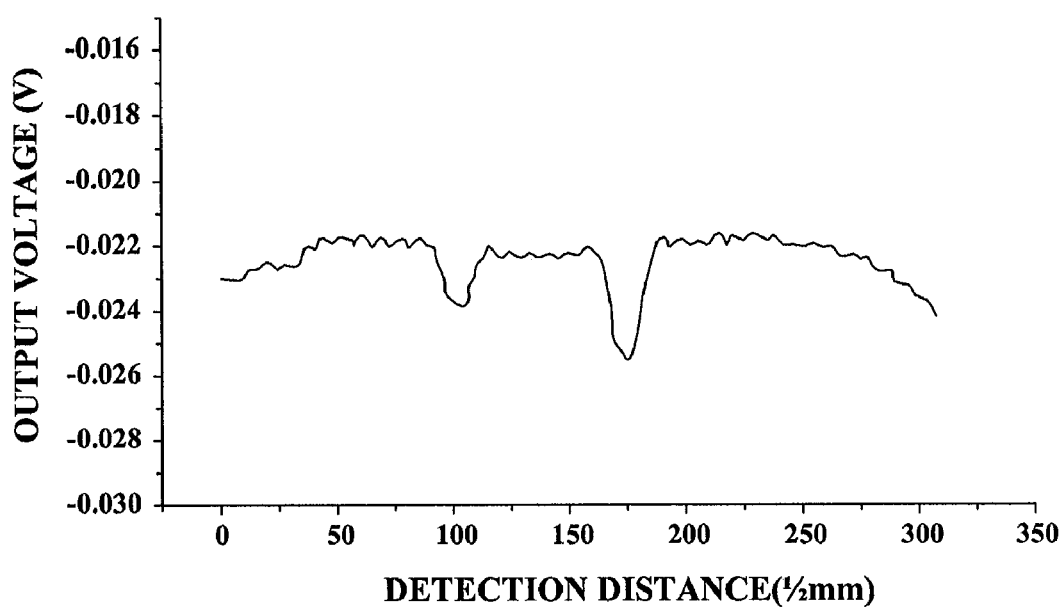
FIG. 8 is a graph illustrating a result of the detection apparatus according to this invention.

FIG. 8 is a graph illustrating a result of the detection apparatus according to this invention.

Strength of an output voltage V, which is measured by the detection apparatus 100 of FIG. 1 based on a detection distance of 0.5 mm, is illustrated in FIG. 8. As illustrated in FIG. 8, the first detection information via the bobbin type probe 110 of FIG. 1 or the second detection information via the yoke type detection probe 120 of FIG. 1 is detected on a location where the strength of the output voltage V is changed according to a change of the detection distance. As a result of this, the operator may understand the axial defect, the material by the magnetic phase, the circumferential defect, and a precise location of the defects.

Figure 9:
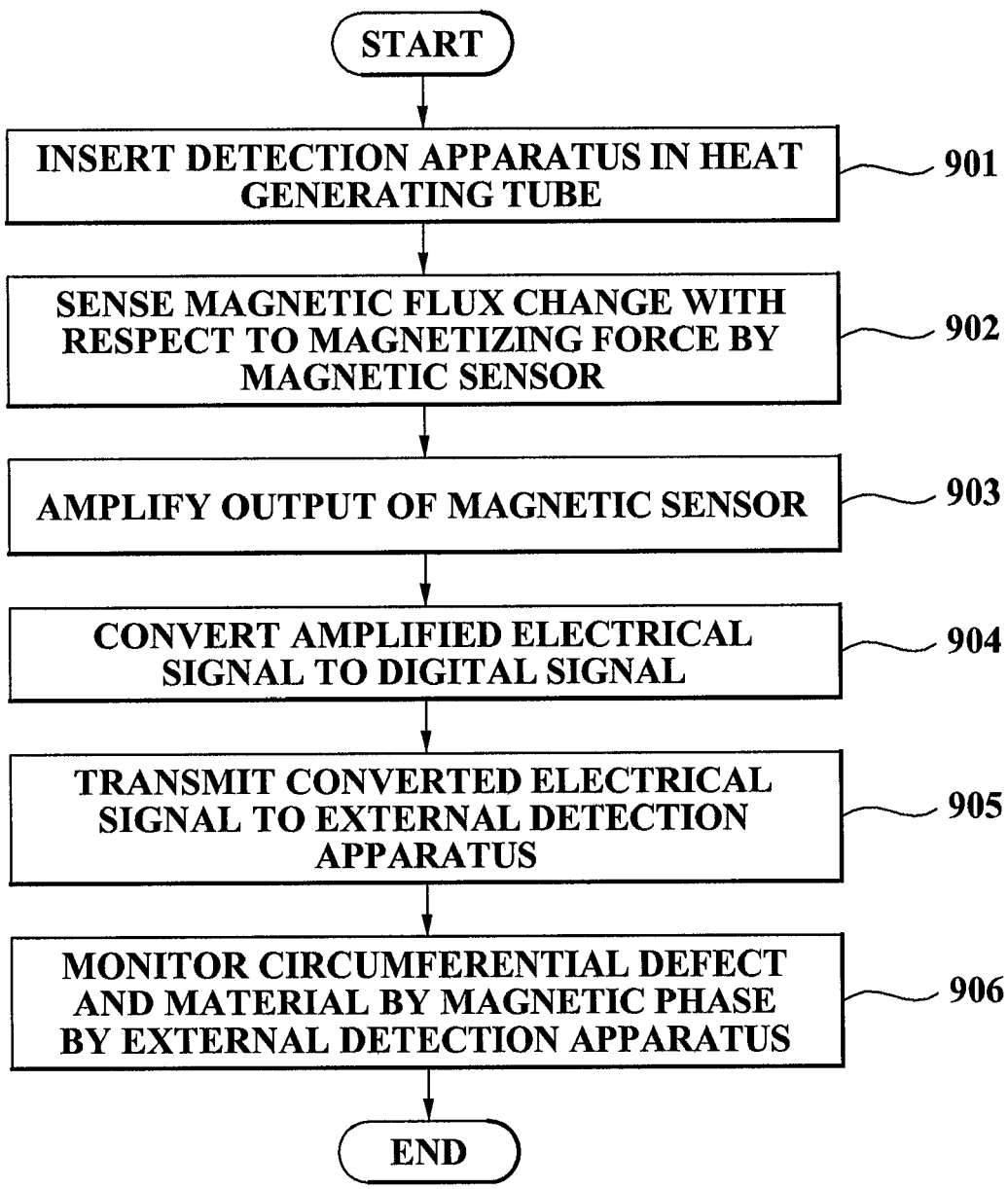
FIG. 9 is a flowchart to illustrate a defect detection method according to an embodiment of the present invention.

FIG. 9 is a flowchart illustrating a defect detection method according to an embodiment of the present invention.

Referring to FIG. 9, in operation 901, the detection apparatus 100 of FIG. 1 is inserted in the heat generating tube 140 of FIG. 1.

In operation 902, the yoke type probe 120 of the detection apparatus 100 of FIG. 1 generates a magnetizing force in a second coil according to a predetermined power which is supplied to a first coil, and senses a magnetic flux change with respect the magnetizing force.

In operation 903, the magnetic sensor 320 of FIG. 3 outputs a predetermined analog type electrical signal according to a magnetic flux change in a second coil, and the amplifier 330 of FIG. 3 amplifies amplitude of the predetermined analog type electrical signal. In this instance, as described above, the magnetic sensor 320 senses each of a quadrature component with respect to magnetic flux change –dØ/dt, and amplifies a corresponding component.

In operation 904, the detection apparatus 100 of FIG. 1 converts the amplified electrical signal to a digital signal via the AD converter 340 of FIG. 3, via processes such as sampling and quantization, in order to reflect the quadrature components.

The detection apparatus 100 of FIG. 1 transmits the converted electrical signal to an external detection apparatus in operation 905, and the external detection apparatus outputs the electrical signal received from the detection apparatus 100 of FIG. 1 in operation 906. A manager checks the electrical signal, which is outputted from the external detection apparatus, accordingly may monitor a circumferential defect by a magnetic phase and information such as a location where the circumferential defect has occurred.

The bobbin type probe 110 of FIG. 1 forms a magnetizing force according to a predetermined alternating current source which is supplied to a first coil, and acquires first detection information. Specifically, when an axial defect occurs in the heat generating tube 140 of FIG. 1, and when the circumferential defect by the magnetic phase occurs in the heat generating tube 140, the detection apparatus 100 of FIG. 1 acquires the first detection information via the bobbin type probe 110, or acquires the second detection information via the yoke type probe 102 of FIG. 1. The first detection information acquired by the bobbin type probe 110 is the axial defect, and the second detection information acquired by the yoke type probe 120 of FIG. 1 is a material by the magnetic phase or the circumferential defect by the magnetic phase. The first detection information is transmitted to the operator via the external detection apparatus, the second detection information is converted to the electrical signal by the magnetic sensor 320 of FIG. 3 in the signal processor 300 of FIG. 3, and is undergone the amplifier 330 and the AD converter 340 of FIG. 3, and is transmitted to the external detection apparatus. As described above, the first detection information and the second detection information are information of a magnetic flux density and changes over time of the magnetic force.

As described above, the operator may check, using the detection apparatus 100 of FIG. 1, the axial defect, and also may check the material by the magnetic phase and the circumferential defect by the magnetic phase, which are unable to be detected in the conventional art. Also, defects occurring in the heat generating tube 140 of FIG. 1 may be measured more rapidly, precisely, and easily using a motorized rotating pan cake (MRPC) probe.

Figure 10:
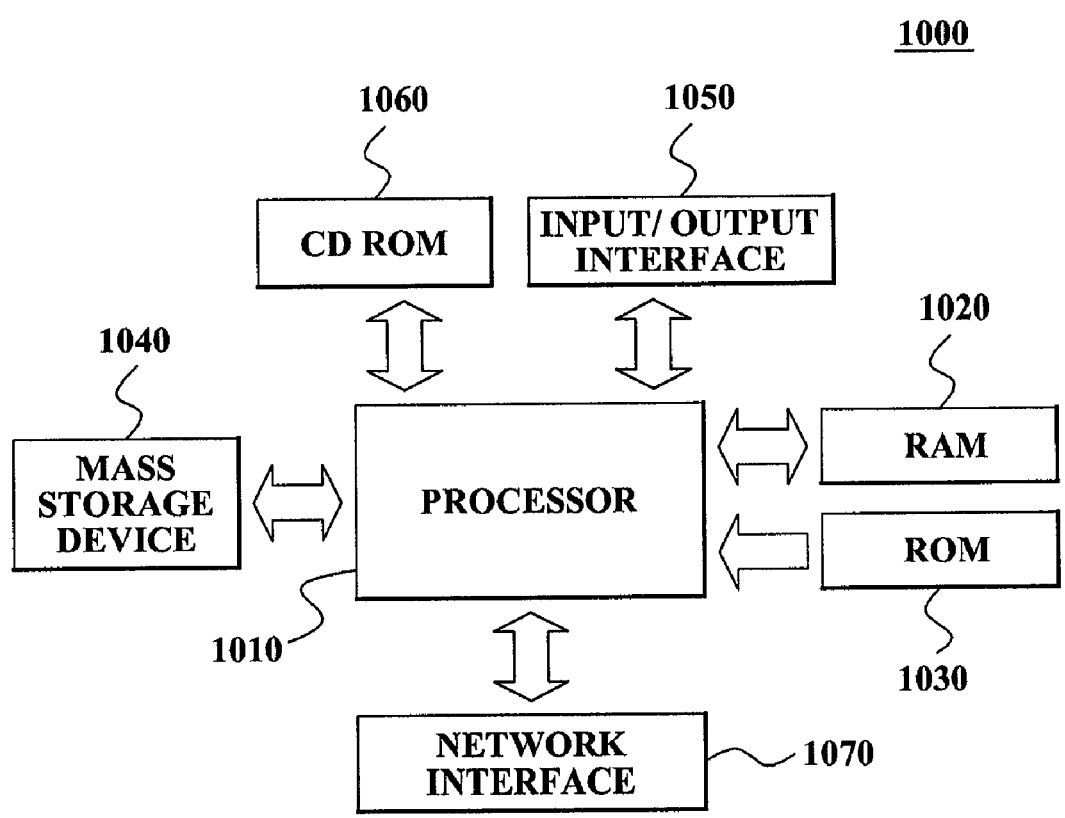
FIG. 10 is an inner block diagram illustrating a general computer which can be adopted as an external detection apparatus which can perform the defect detection method according to an embodiment of the present invention.

FIG. 10 is an inner block diagram illustrating a general computer which can be adopted as an external apparatus which can monitor the defect detection method according to an embodiment of the present invention.

The computer 1000 includes at least one processor 1010 which is connected with a main memory device including read-only random access memory (RAM) 1020 and memory devices (ROM) 1030. The processor 1010 is also known as a central processing unit CPU. As well-known in the field of the art, the ROM 1030 unidirectionally transmits data and instructions to the CPU, and the RAM 1020 is generally used for bidirectionally transmitting data and instructions. The RAM 1020 and the ROM 1030 may include a certain proper form of a computer-readable recording medium. A mass storage device 1040 is bidirectionally connected to the processor 1010 to provide additional data storage capacity and may be one of number of computer-readable recording mediums. The mass storage device 1040 is used for storing programs and data and is an auxiliary memory. A particular mass storage device such as a CD ROM 1060 may be used. The processor 1010 is connected to at least one input/output interface 1050 such as a video monitor, a track ball, a mouse, a keyboard, a microphone, a touch-screen type display, a card reader, a magnetic or paper tape reader, a voice or hand-writing recognizer, a joystick, or other known computer input/output unit. The processor 1010 may be connected to a wired or wireless communication network via a network interface 1070. The procedure of the described method can be performed via the network connection. The described devices and tools are well-known to those skilled in the art of computer hardware and software.

The defect detection method according to the above-described embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

As described above, a defect detection apparatus in a heat generating tube according to the present invention, which can rapidly, precisely, and easily detect an axial defect occurring in the heat generating tube, and also detect a material by a magnetic phase causing an error of analyzing a signal and a circumferential defect, is provided.

The invention claimed is:

1. A defect detection apparatus for an inside of a steam generator tubing in a nuclear reactor, the apparatus comprising:
   a bobbin type probe forming a magnetizing force using a coil which is wound in a circumferential direction on at least one bobbin to acquire first detection information to determine a defect of the steam generator tubing;

a yoke type probe forming a magnetizing force using a coil which is wound in an axial direction on at least one yoke to acquire second detection information from the steam generator tubing, wherein the at least one yoke is located in a direction perpendicular with the at least one bobbin; and a signal processor for processing the second detection information to generate a corresponding digital signal, the signal processor further comprises:

a voltage control circuit supplying a power to a first coil of the yoke type probe, a magnetic sensor sensing a magnetic flux change, having been formed on a second coil of the yoke type probe as a result of the supplying of the power to the first coil of the yoke type probe, and generating the second detection information, and an analog to digital (AD) converter converting the second detection information to generate the corresponding digital signal, wherein the defect detection apparatus determines a material at a location of the defect from a magnetic phase based on the first detection information and one or more of the corresponding digital signal and the second detection information.

2. The detection apparatus of claim 1, wherein the first and second detection information are information about a magnetic flux change over time.

3. The detection apparatus of claim 1, wherein an axial defect of the steam generator tubing is determined according to the first detection information.

4. The detection apparatus of claim 3, wherein a circumferential defect of the steam generator tubing is determined according to the second detection information.

5. The detection apparatus of claim 1, wherein the signal processor detects a quadrature component with respect to the magnetic flux change which indicates the second detection information by referring to a phase of an external alternating current (AC) source, and generates data to determine the material at the location of the defect according to the magnetic phase of the defect.

6. The detection apparatus of claim 1, wherein the magnetic sensor detects a quadrature component with respect to the magnetic flux change which indicates the second detection information.

7. The detection apparatus of claim 1, wherein the coil is wound on a portion of the at least one yoke that is located on an imaginary line which connects a central axis of the steam generator tubing with an external contact point of the steam generator tubing.

8. The detection apparatus of claim 1, wherein the at least one yoke is made of any one of a ferrite and an electric steel sheet (SiFe).

9. A defect detection method for an inside of a heat generating tube, the method comprising:

forming a first magnetizing force using a coil which is wound in a circumferential direction on at least one bobbin;

sensing a change of the first magnetizing force, and acquiring first detection information to determine a defect of the heat generating tube;

supplying a power to a first coil of at least one yoke with a voltage control circuit;

forming a second magnetizing force by using the first coil of the at least one yoke which is wound in an axial direction on the at least one yoke, wherein the at least one yoke is located in a direction perpendicular with the at least one bobbin;

sensing a change of the second magnetizing force, having been formed on a second coil of the at least one yoke as a result of the supplying of the power to the first coil of the at least one yoke, with a magnetic sensor and generating second detection information;

converting the second detection information with an analog to digital (AD) converter to generate a corresponding digital signal; and determining a material at a location of the defect from a magnetic phase based on the first detection information and one or more of the corresponding digital signal and the second detection information.

10. The detection method of claim 9, wherein the first and second detection information are information of a magnetic flux change over time.

11. The detection method of claim 9, wherein an axial defect of the heat generating tube is determined according to the first detection information, and a circumferential defect of the heat generating tube is determined according to the second detection information.

12. A non-transitory computer-readable storage medium storing a program for implementing the detection method of any one of claims 9 through 11.

13. The detection apparatus of claim 1, wherein the material at the location of the defect determined from the magnetic phase based on the second detection information identifies the defect as being one of critical or non-critical.

14. The detection apparatus of claim 1, wherein the second coil of the yoke type probe is wound in the axial direction on the at least one yoke.

15. The detection method of claim 9, wherein the material at the location of the defect determined from the magnetic phase based on the second detection information identifies the defect as being one of critical or non-critical.

16. The detection method of claim 9, wherein the second coil of the at least one yoke is wound in the axial direction on the at least one yoke.

17. The detection apparatus of claim 1, wherein the at least one yoke of the yoke type probe comprises at least a first yoke and a second yoke, wherein the first yoke is located in a direction perpendicular with the at least one bobbin and the second yoke is located in a direction perpendicular with the at least one bobbin.

18. The detection method of claim 9, wherein the at least one yoke comprises at least a first yoke and a second yoke, wherein the first yoke is located in a direction perpendicular with the at least one bobbin and the second yoke is located in a direction perpendicular with the at least one bobbin.

19. The detection apparatus of claim 1, wherein the signal processor further comprises:

a first voltage control circuit supplying a power to a first coil of the bobbin type probe;

a first magnetic sensor sensing the magnetic flux change, having been formed on a second coil of the bobbin type probe as a result of the supplying of the power to the first coil of the bobbin type probe, and generating the first detection information;

the analog to digital (AD) converter converting the first detection information to a corresponding first digital signal.

20. The detection apparatus of claim 1, wherein at least one of the first coil of the yoke type probe and the second coil of the yoke type probe being perpendicular to the coil of the bobbin type probe.

21. The detection apparatus of claim 1, wherein the material that is determined is a form of corrosion.

* * * * *